US012754636B2

(12) United States Patent
Chang et al.

(10) Patent No.: US 12,754,636 B2
(45) Date of Patent: Oct. 6, 2026

(54) DRIVING SIGNAL GENERATOR

(71) Applicant: HIMAX TECHNOLOGIES LIMITED, Tainan City (TW)

(72) Inventors: Yaw-Guang Chang, Tainan City (TW); Ren-Yuan Huang, Tainan City (TW); Chun-Jen Su, Tainan City (TW); Wen-Tse Chiu, Tainan City (TW)

(73) Assignee: HIMAX TECHNOLOGIES LIMITED, Tainan City (TW)

( * ) Notice: Subject to any disclaimer, the term of this patent is extended or adjusted under 35 U.S.C. 154(b) by 32 days.

(21) Appl. No.: 18/624,123

(22) Filed: Apr. 2, 2024

(65) Prior Publication Data

US 2025/0306710 A1 Oct. 2, 2025

Related U.S. Application Data

(60) Provisional application No. 63/534,361, filed on Aug. 24, 2023.

(51) Int. Cl.
*G06F 3/041* (2006.01)

(52) U.S. Cl.
CPC .................................. *G06F 3/0418* (2013.01)

(58) Field of Classification Search
CPC ....................................................... G06F 3/041
USPC .................................................. 345/173–174
See application file for complete search history.

(56) References Cited

U.S. PATENT DOCUMENTS

| | | | | |
|---|---|---|---|---|
| 2015/0301649 | A1* | 10/2015 | Kim | G06F 3/0446 345/174 |
| 2017/0123528 | A1* | 5/2017 | Hu | G06F 3/0412 |
| 2017/0285859 | A1* | 10/2017 | Shepelev | G06F 3/0446 |
| 2018/0046273 | A1* | 2/2018 | Brunet | G06F 3/041662 |
| 2020/0067495 | A1* | 2/2020 | Roberson | G06F 3/0416 |
| 2021/0200415 | A1* | 7/2021 | Jun | G06F 3/0418 |
| 2023/0079469 | A1 | 3/2023 | Chang et al. | |
| 2024/0012509 | A1* | 1/2024 | Wan | G06F 3/04166 |

FOREIGN PATENT DOCUMENTS

| | | | | |
|---|---|---|---|---|
| CN | 102799306 | | 12/2016 | |
| CN | 114816121 | A * | 7/2022 | G06F 3/04182 |
| EP | 3144790 | A1 * | 3/2017 | G06F 3/041662 |
| WO | WO-2013058446 | A1 * | 4/2013 | G06F 3/04184 |

OTHER PUBLICATIONS

"Search Report of European Counterpart Application", issued on Aug. 25, 2025, p. 1-p. 15.

* cited by examiner

*Primary Examiner* — Kwin Xie
(74) *Attorney, Agent, or Firm* — JCIPRNET

(57) ABSTRACT

A driving signal generator includes a window function code generator, a sine wave code generator, an operation circuit and a signal converter. The window function code generator generates a first code corresponding to a window of a first sine wave. The sine wave code generator generates a second code corresponding to a second sine wave, wherein a frequency of the second sine wave is higher than a frequency of the first sine wave. The operation circuit is coupled to the window function code generator and the sine wave code generator, and performs an operation on the first code and the second code to generate an output code. The signal converter is coupled to the operation circuit and generates a touch driving voltage of a driving signal by converting the output code.

12 Claims, 14 Drawing Sheets

DRIVING SIGNAL GENERATOR

BACKGROUND

Technical Field

The disclosure relates to a driving signal generator, and more particularly, to the driving signal generator which can reduce Electromagnetic Interference (EMI).

Description of Related Art

In today's electronic products, a touch detection device and a display device are integrated into a touch display device. The touch display device may perform display function and touch detection function with time division scheme. Please refer to FIG. 1, which illustrates a waveform plot of the touch display device of prior art. In FIG. 1, a touch detection function F2 is performed between two display function F1 and F3 in a time sequence, and the display function F1, F3 and the touch detection function may be operated through a same driving signal 110 or 111. In a positive touch scheme, a display driving voltage VD of the driving signal 110 is smaller than a minimum voltage Vm of driving signal 110 for the touch detection function F3, and in a negative touch scheme, the display driving voltage VD of the driving signal 111 is larger than a maximum voltage VM of driving signal 111 for the touch detection function F3. It can be seen, in prior art, there are discontinue points of the voltage level of the driving signals 110 and 111, and un-sine wave signals on the driving signals 110 and 111 may cause a lot of harmonics on a frequency spectrogram, and EMI may be generated correspondingly.

SUMMARY

The disclosure provides a plurality of driving signal generators, which can reduce Electromagnetic Interference (EMI).

One of the driving signal generators includes a window function code generator, a sine wave code generator, an operation circuit and a signal converter. The window function code generator generates a first code corresponding to a window of a first sine wave. The sine wave code generator generates a second code corresponding to a second sine wave, wherein a frequency of the second sine wave is higher than a frequency of the first sine wave. The operation circuit is coupled to the window function code generator and the sine wave code generator, and performs an operation on the first code and the second code to generate an output code. The signal converter is coupled to the operation circuit and generates a touch driving voltage of a driving signal by converting the output code.

Another one of the driving signal generator includes a sine wave code generator, a voltage shifting code generator, a first switch, a second switch and a signal converter. The sine wave code generator generates a first code corresponding to a first sine wave. The voltage shifting code generator generates a second code corresponding to a ramp wave. The first switch is coupled between the sine wave code generator and the signal converter, and controlled by a first control signal to provide the first code to the signal converter. The second switch is coupled between the voltage shifting code generator and the signal converter, and controlled by a second control signal to provide the second code to the signal converter. The signal converter is coupled to the operation circuit, and generates a touch driving voltage of the driving signal by converting the first code and the second code.

Based on the above, each of the driving signal generators of present disclosure generates the touch driving voltage of the driving signal by gradually increasing or decreasing voltage level. Such as that, waveform of the driving signal may be similar to a sine wave and harmonics of the driving signal may be reduced, and EMI of a corresponding touch display device may be reduced, too.

DETAILED DESCRIPTION OF DISCLOSED EMBODIMENTS

Figure 1:
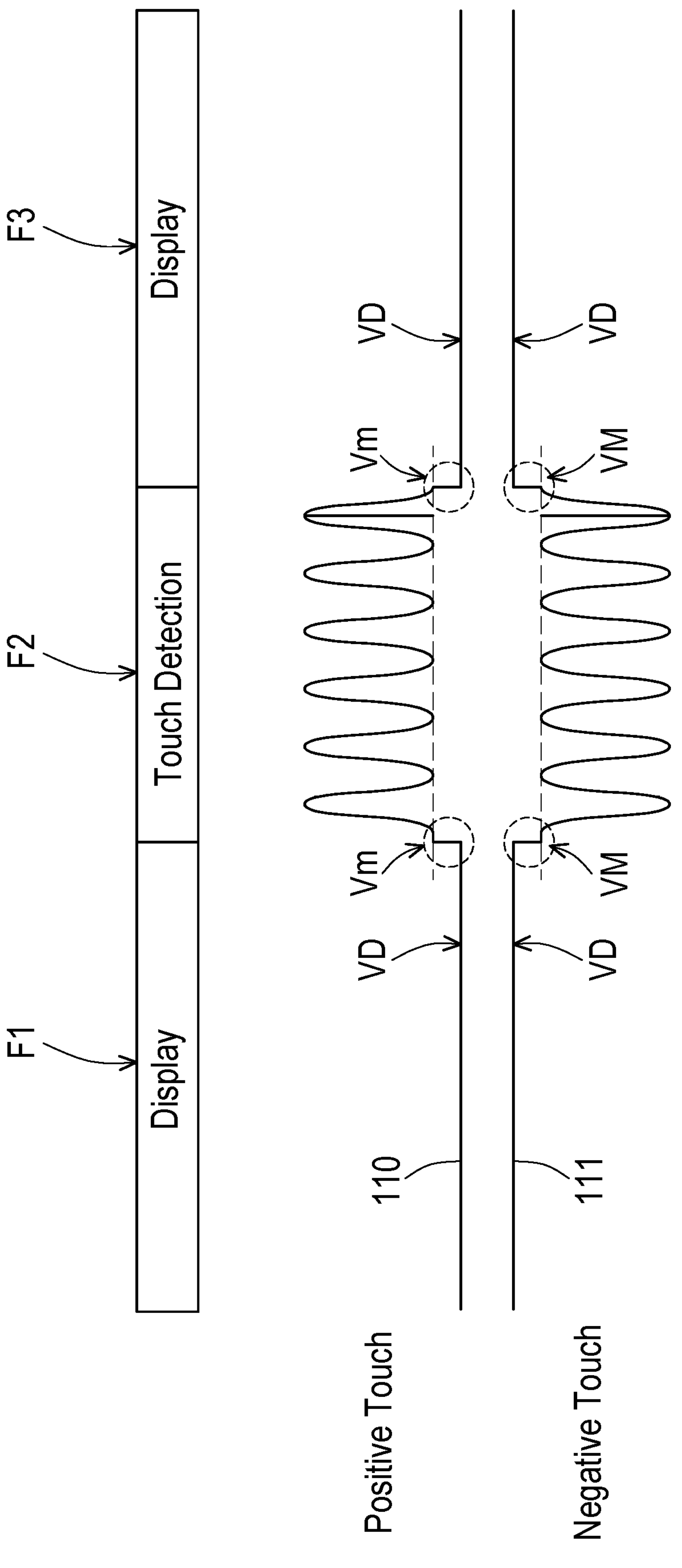
FIG. 1 (PRIOR ART)
FIG. 1 illustrates a schematic diagram of a touch display device of prior art.
Figure 2:
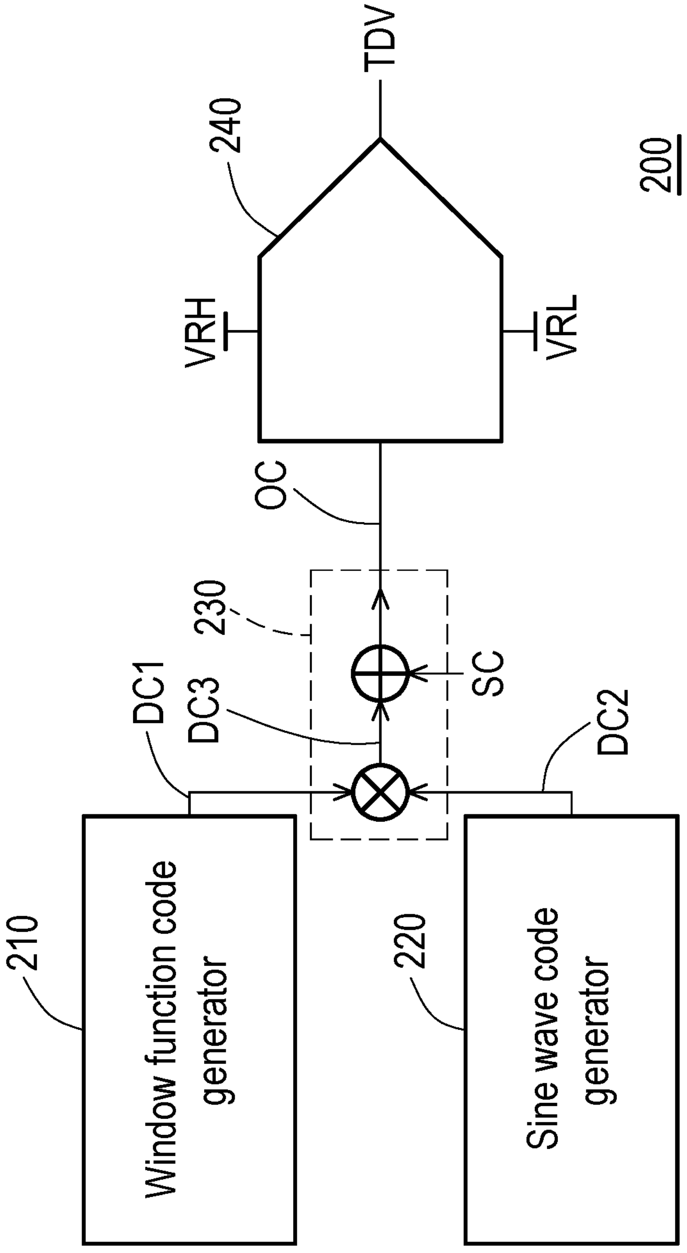
FIG. 2 illustrates a schematic diagram of a driving signal generator according to an embodiment of present disclosure.

Please refer to FIG. 2, which illustrates a schematic diagram of a driving signal generator according to an embodiment of present disclosure. A driving signal generator 200 includes a window function code generator 210, a sine wave code generator 220, an operation circuit 230 and a signal converter 240. The window function code generator 210 is configure to generate a first code DC1 corresponding to a window of a first sine wave. The sine wave code generator 120 is configure to generate a second code DC2 corresponding to a second sine wave. In this embodiment, the first sine wave may be an envelope of the second sine wave, and a frequency of the second sine wave is higher than a frequency of the first sine wave. Detail waveforms of the first sine wave and the second sine wave can be seen by referring to FIG. 3 which illustrates a waveform plot of the first sine wave 211 and the second sine wave 221 according to the embodiment of FIG. 2.

Figure 3:
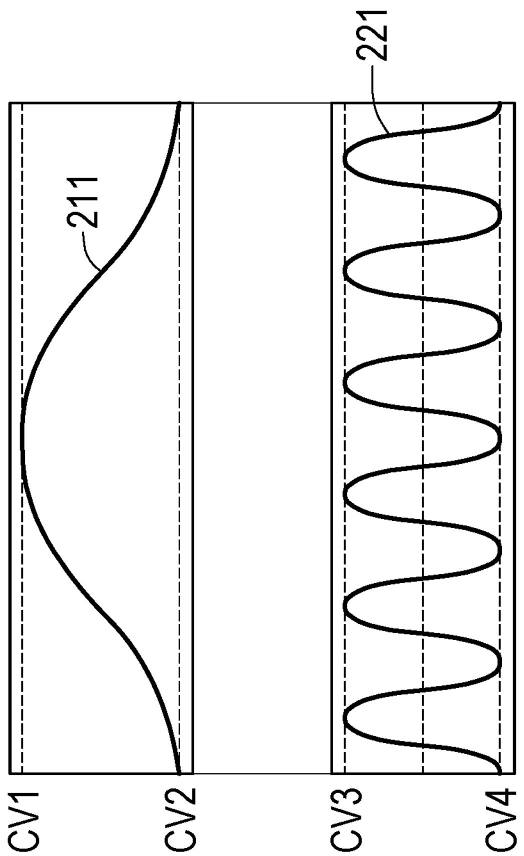
FIG. 3 illustrates a waveform plot of the first sine wave 211 and the second sine wave 221 according to the embodiment of FIG. 2.

In FIG. 3, the window function code generator 210 may generate the first code DC1 varying between a first value CV1 and a second value CV2. In detail, the window function code generator 210 may generate the first code DC1 with the first value CV1 if the first sine wave 211 has a maximum amplitude. The window function code generator 210 may generate the first code DC1 with the second value CV2 if the first sine wave 211 has a minimum amplitude. On the other hand, the sine wave code generator 220 may generate the second code DC2 varying between a third value CV3 and a fourth value CV4. In detail, the sine wave code generator 220 may generate the first code DC2 with the third value CV2 if the second sine wave 221 has a maximum amplitude. The sine wave code generator 220 may generate the second code DC2 with the fourth value CV3 if the second sine wave 221 has a minimum amplitude.

Besides, the window function code generator 210 may adjust a value of the first code DC1 in a time sequence correspond to an amplitude of the first sine wave 211, and the sine wave code generator 220 may adjust a value of the second code DC2 in the time sequence correspond to an amplitude of the second sine wave 221. In this embodiment, the first code DC1 and the second code DC2 may be two digital codes.

In one embodiment, each of the window function code generator 210 and the sine wave code generator 220 may include an analog to digital converter. The window function code generator 210 may sample the first sine wave 211, and convert the amplitude of the first sine wave 211 corresponding to each of a plurality of sample points to generate the first code DC1. The sine wave code generator 220 may sample the second sine wave 221, and convert the amplitude of the second sine wave 211 corresponding to each of a plurality of sample points to generate the second code DC2.

In another embodiment, each of the window function code generator 210 and the sine wave code generator 220 may include a look-up table. Each of the look-up tables is used to records a plurality of digital codes corresponding to amplitudes of the each of the first sine wave 211 and the second sine wave 221 corresponding to a plurality of time points, respectively. The window function code generator 210 and the sine wave code generator 220 may respectively generate the first code DC1 and the second code DC2 from look-up tables in a time sequence.

On the other hand, the operation circuit 230 is coupled to the window function code generator 210 and the sine wave code generator 220. The operation circuit 230 is configured to receive the first code DC1 generated by the window function code generator 210, and receive the second code DC2 from the sine wave code generator 220. The operation circuit 230 is further coupled to the signal converter 240. The operation circuit 230 perform an operation on the first code DC1 and the second code DC2 to generate an output code OC, and transmits the output code OC to the signal converter 240.

In this embodiment, the operation circuit 230 may include a multiplier 231 and an adder 232. The multiplier 231 is coupled to the window function code generator 210 and the sine wave code generator 220, receives the first code DC1 and the second code DC2, and generate a third code DC3 by multiplying the first code DC1 with the second code DC2. The adder 232 is coupled to the multiplier 231 and the signal converter 240. The adder 231 receives the third code DC3 and a shift code SC, and generates the output code OC by adding the third code DC3 with a shift code SC.

The signal converter 240 receives the output code OC from the adder 232. The signal converter 240 further receives power voltages VRH and VRL as operation powers, where a voltage level of the power voltage VRH is larger than a voltage level of the power voltage VRL. In this embodiment, the signal converter 240 may be a digital to analog converter (DAC), and generate a touch driving voltage TDV of a driving signal by converting the output code OC. The touch driving voltage TDV may be an analog voltage and the output code OC may be a digital code. The touch driving voltage TDV generated by the signal converter 240 may swing between the power voltages VRH and VRL.

Figure 4:
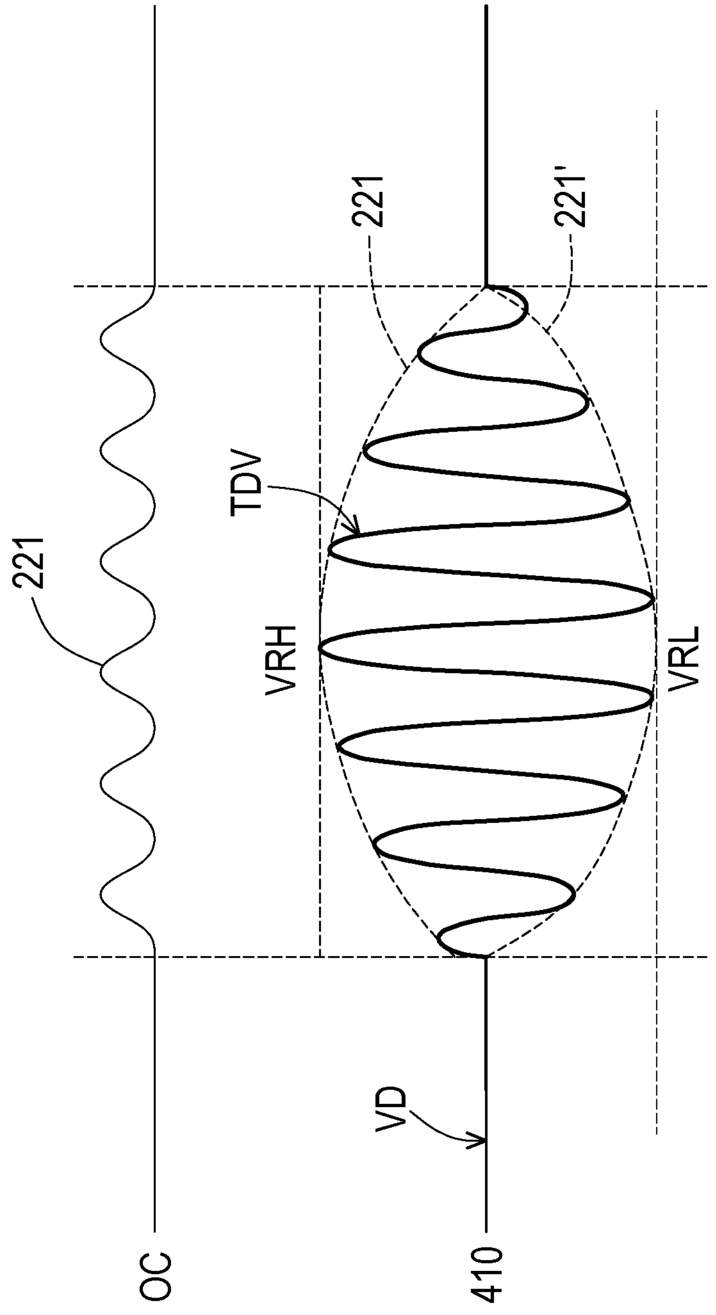
FIG. 4 illustrates waveform plot of the touch driving voltage of the driving signal according to an embodiment of present disclosure.

Please refer to FIG. 2, FIG. 3 and FIG. 4 commonly, wherein FIG. 4 illustrates waveform plot of the touch driving voltage of the driving signal according to an embodiment of present disclosure. In a case that the display driving voltage VD of the driving signal 410 is between a maximum voltage and a minimum voltage of the touch display voltage TDV, wherein the maximum voltage of the touch display voltage TDV is the power voltage VRH, and the minimum voltage of the touch display voltage TDV is the power voltage VRL. The second value CV2 may be half of the first value CV1, and a summation of the third value CV3 and the fourth value CV4 may be Om wherein the third value CV3 is a positive value, and the fourth value CV4 is a negative value. For example, take the output code has 10 bits as an example. The first value CV1 may be 512, the second value may be 256, the third value may be 512 and the fourth value may be −512.

In this case, in FIG. 4, the output code OC may a be digital code correspond to the waveform of the second sine wave 221. The touch display voltage TDV may be a sine wave with gradually increasing and decreasing amplitude. If the display driving voltage VD is 0V, the touch display voltage TDV may enveloped by the first sine wave 211 and an inverted sine wave 211' of the first sine wave 211. In this embodiment, the touch display voltage TDV may swing between the power voltages VRH and VRL.

Figure 5A:
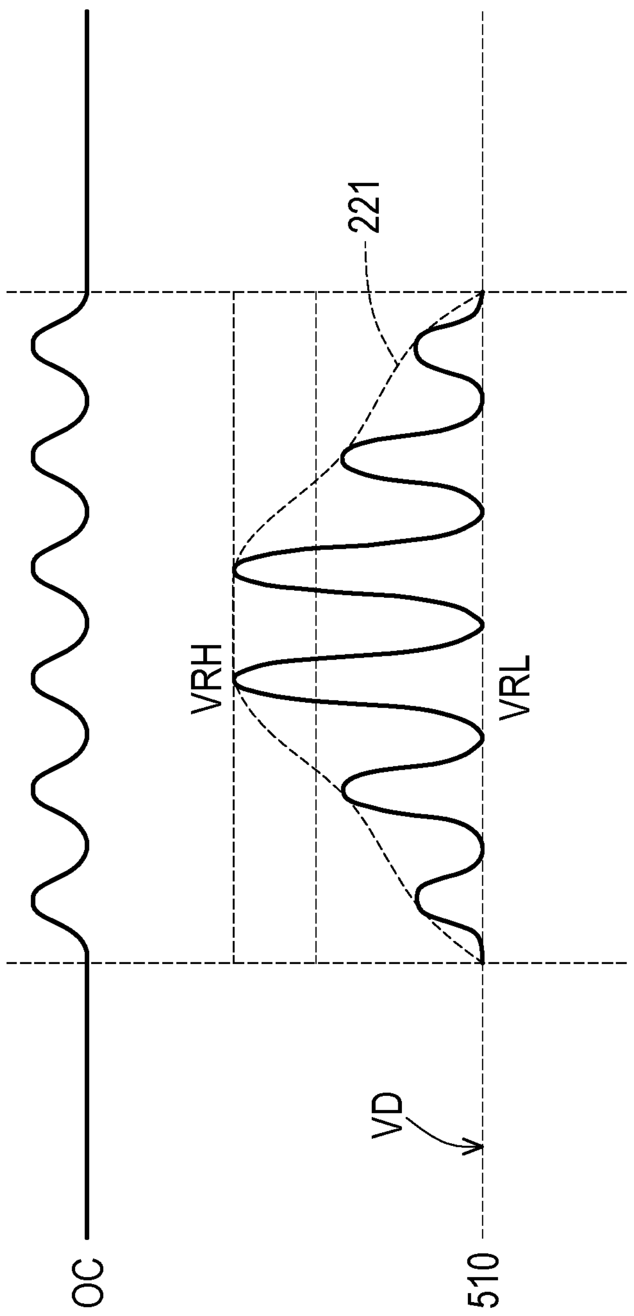
FIG. 5A and FIG. 5B illustrate waveform plots of the touch driving voltage of the driving signal according to another embodiment of present disclosure.
Figure 5B:
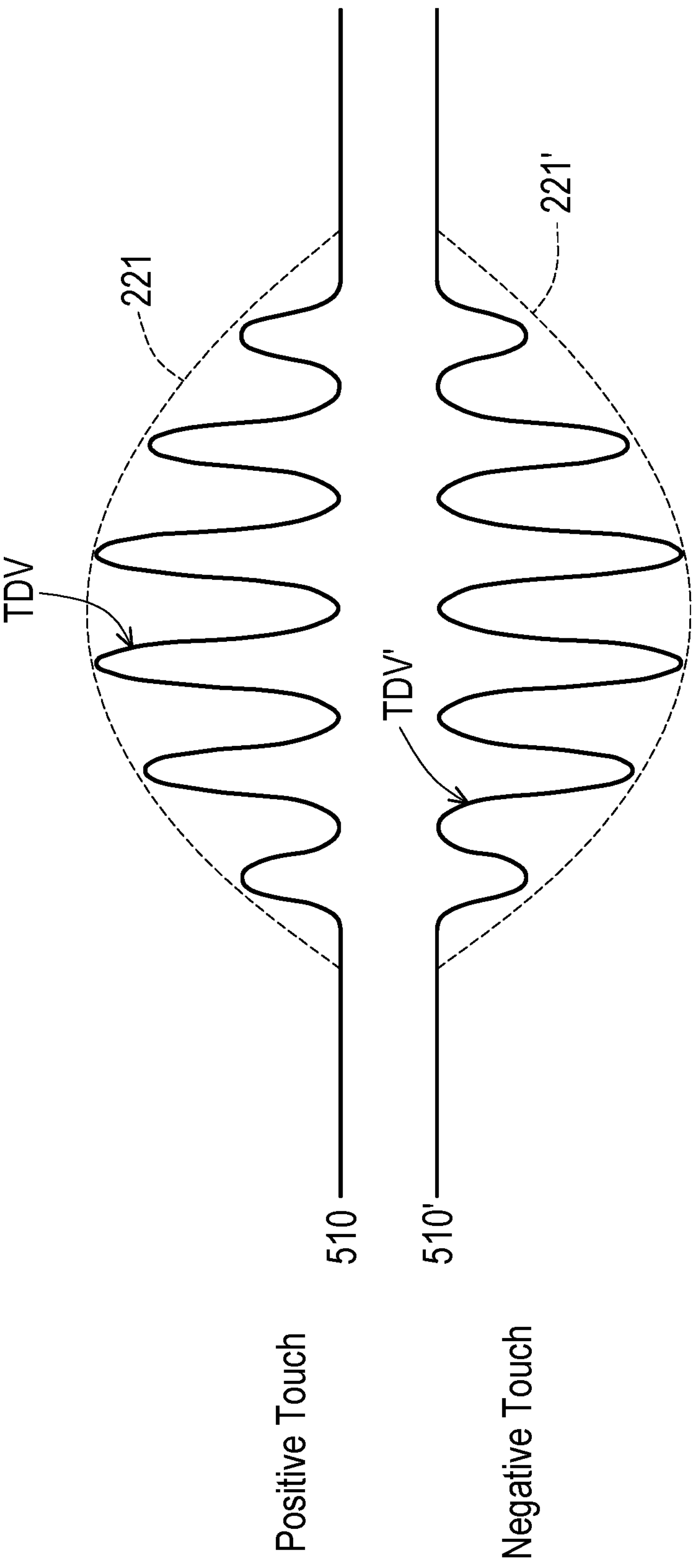

Please refer to FIG. 2, FIG. 3, and FIG. 5A and FIG. 5B commonly, wherein FIG. 5A and FIG. 5B illustrate waveform plots of the touch driving voltage of the driving signal according to another embodiment of present disclosure. In a case that the display driving voltage VD of the driving signal 410 is smaller than a maximum voltage of the touch display voltage TDV or the display driving voltage VD of the driving signal 410 is larger than a minimum voltage of the touch display voltage TDV. The second value CV2 may be 0, the first value CV1 may be a positive value, and a summation of the third value CV3 and the fourth value CV4 may be 0, wherein the third value CV3 is a positive value, and the fourth value CV4 is a negative value. For example, take the output code has 10 bits as an example. The first value CV1 may be 512, the third value may be 512 and the fourth value may be −512.

In this case, in FIG. 5A, the output code OC may also be a digital code correspond to the waveform of the second sine wave 221. The touch display voltage TDV may be a sine wave with gradually increasing amplitude. If the display driving voltage VD is 0V, the touch display voltage TDV may enveloped by the first sine wave 211. In this embodiment, the touch display voltage TDV may swing between the power voltages VRH and VRL, wherein the power voltage VRL may be 0V.

In FIG. 5B, in a positive touch operation of this case, the amplitude of the touch display voltage TDV of the driving signal 510 may be not smaller than 0V, and is enveloped by the sine wave 221 with a positive amplitude. On the other hand, in a negative touch operation, the amplitude of the touch display voltage TDV of the driving signal 510' may not be larger than 0V, and is enveloped by the sine wave 221' which is inverted to the sine wave 221.

Figure 6:
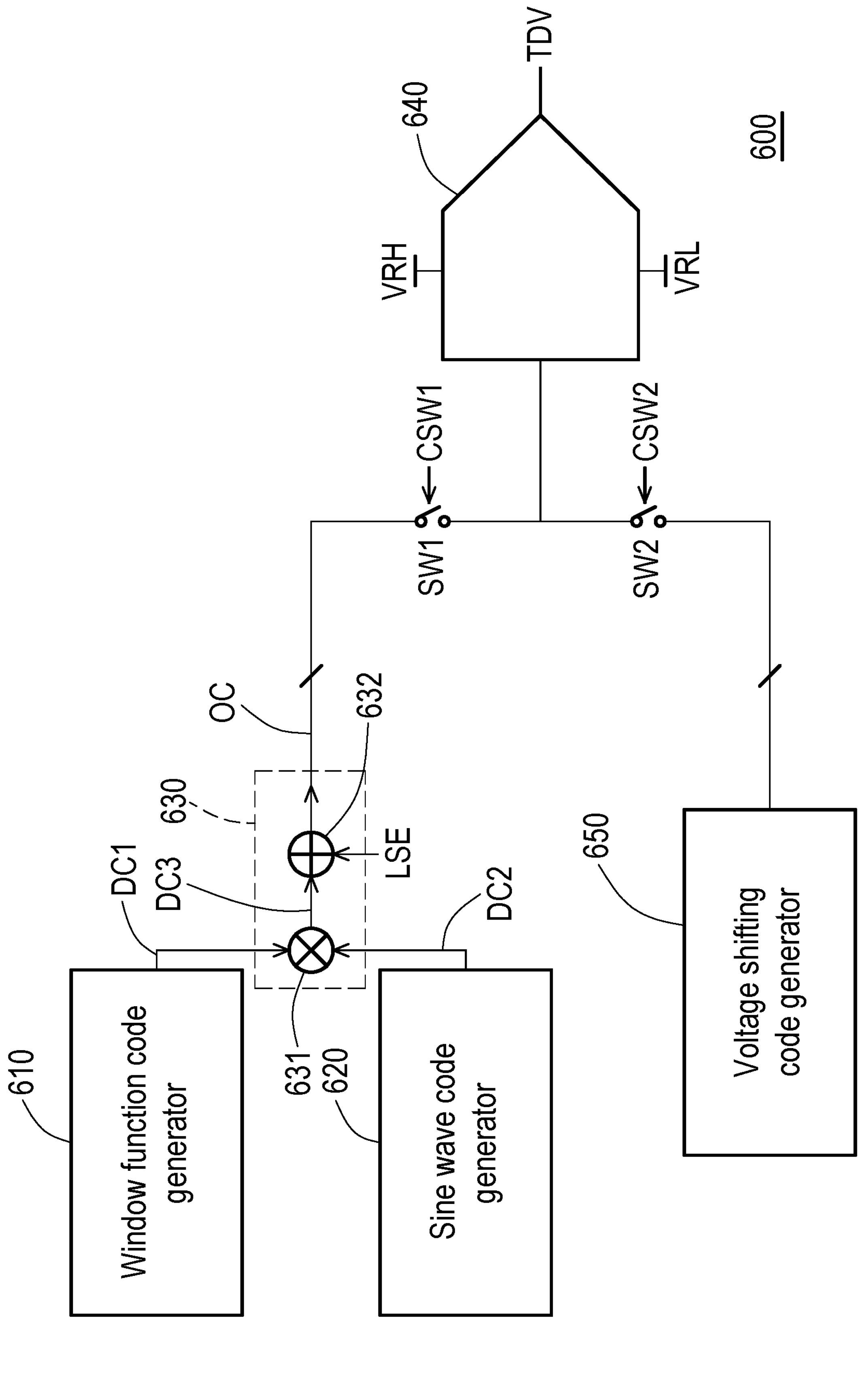
FIG. 6 illustrates a schematic diagram of a driving signal generator according to an embodiment of present disclosure.

Please refer to FIG. 6, which illustrates a schematic diagram of a driving signal generator according to an embodiment of present disclosure. A driving signal generator 600 includes a window function code generator 610, a sine wave code generator 620, an operation circuit 630, a signal converter 640, a voltage shifting code generator 650 and switches SW1 and SW2. The window function code generator 610 is configure to generate a first code DC1 corresponding to a window of a first sine wave. The sine wave code generator 620 is configure to generate a second code DC2 corresponding to a second sine wave. In this embodiment, the first sine wave may be an envelope of the second sine wave, and a frequency of the second sine wave is higher than a frequency of the first sine wave. The operation circuit 630 includes a multiplier 631 and an adder 632. The multiplier 631 multiplies the first code DC1 and the second code DC2 to generate a code DC3, the adder 632 adds the code DC3 with a shifting code SC to generate an output code OC. The detail operations of the window function code generator 610, the sine wave code generator 620 and the operation circuit 630 are similar to the window function code generator 210, the sine wave code generator 220 and the operation circuit 230 in FIG. 2, and no more repeated descriptions here.

In this embodiment, the operation circuit 630 is coupled to an input end of the signal converter 640 through the switch SW1. The input end of the signal converter 640 is further coupled to the voltage shifting code generator 650 through the switch SW2. The voltage shifting code generator 650 provide a third code DC4. When the switch SW1 is turned on, the output code OC may be provided to an input end of the signal converter 640, and when the SW2 is turned on, the third code DC3 may be provided to the input end of the signal converter 640. In this embodiment, the switches SW1 and SW2 are not turned on simultaneously. That is, when the switch SW1 is turned on, the switch SW2 is cut-off, and when the switch SW2 is turned on, the switch SW1 is cut-off. In this embodiment, the switched SW1 and SW2 are respectively controlled by control signals CSW1 and CSW2 to be turned on or cut-off.

The signal converter 640 receives a power voltages VRH and VRL as operation powers, where a voltage level of the power voltage VRH is larger than a voltage level of the power voltage VRL. The signal converter 240 may be a digital to analog converter (DAC), and generate a touch driving voltage TDV of a driving signal by converting a combination of the output code OC and the third code DC4.

Figure 7:
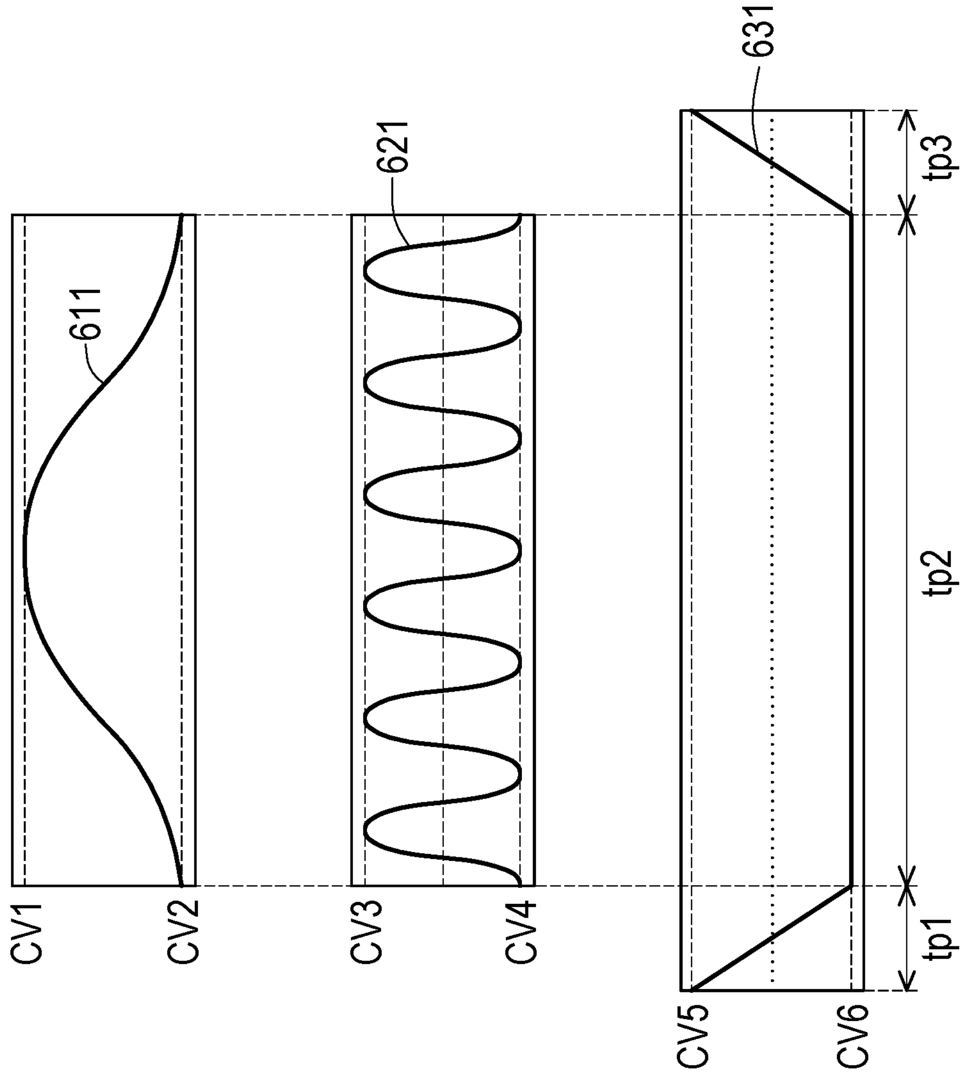
FIG. 7 illustrates a schematic diagram of code providing operation of the window function code generator 610, the sine wave code generator 620 and the voltage shifting code generator 650 of the embodiment of FIG. 6.

Please refer to FIG. 7, which illustrates a schematic diagram of code providing operation of the window function code generator 610, the sine wave code generator 620 and the voltage shifting code generator 650 of the embodiment of FIG. 6. The window function code generator 610 provides the first code DC1 corresponding to a sine wave 611. The sine wave code generator 620 provides the second code DC2 corresponding to a sine wave 621. The voltage shifting code generator 650 provides the third code DC4 corresponding to a ramp wave 631. In here, the sine wave 611 is used to be an envelope wave of the sine wave 612, wherein a frequency of the sine wave 612 is higher than a frequency of the sine wave 611. The sine waves 611 and 621 are overlapped during a time period tP2. During a time period tP1, the ramp wave 631 has a negative slope; during a time period tP3, the ramp wave 631 has a positive slope; and during the time period tP2, the ramp wave 631 may be a horizontal line. The time period tP1 is before the time period tP3, and the time period tP2 is between the time periods tP1 and tP3.

In this embodiment, the voltage shifting code generator 650 may sample the ramp wave 631, and convert the amplitude of the ramp wave 631 corresponding to each of a plurality of sample points to generate the third code DC4.

In another embodiment, the voltage shifting code generator 650 may include a look-up table. The look-up table is used to records a plurality of digital codes corresponding to amplitudes of the each of the ramp wave 631 corresponding to a plurality of time points, respectively. The voltage shifting code generator 650 may generate the third code DC4 from look-up tables in a time sequence.

In this embodiment, the first code DC1 generated by the window function code generator 610 is between a first value CV1 and a second value CV2. The second code DC2 generated by the sine wave code generator 620 is between a third value CV3 and a fourth value CV4. The third code DC3 generated by the voltage shifting code generator 650 is between a fifth value CV5 and a sixth value CV6.

Figure 8A:
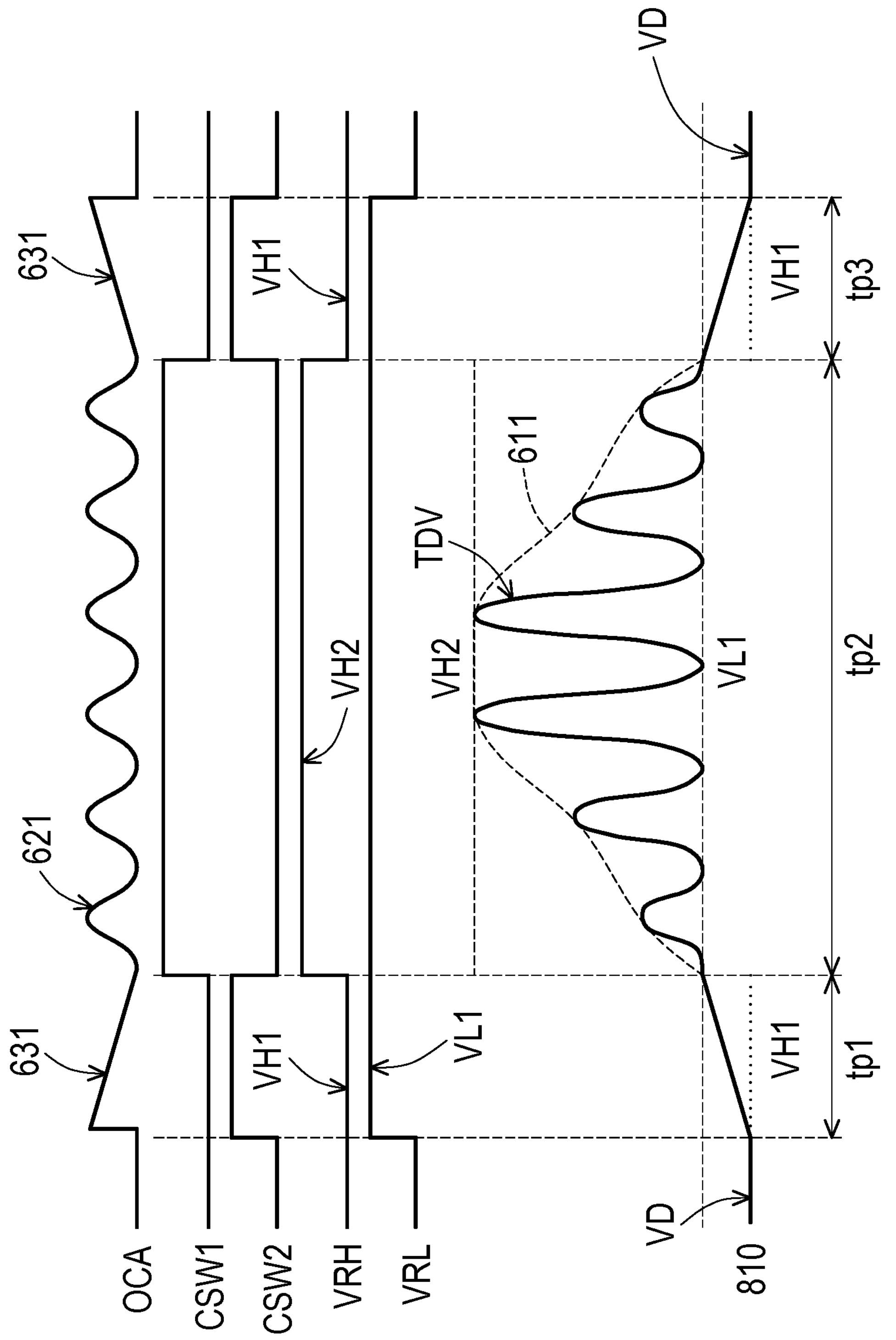
FIG. 8A and FIG. 8B illustrate waveform plots of the touch driving voltage of the driving signal according to another embodiment of present disclosure.
Figure 8B:
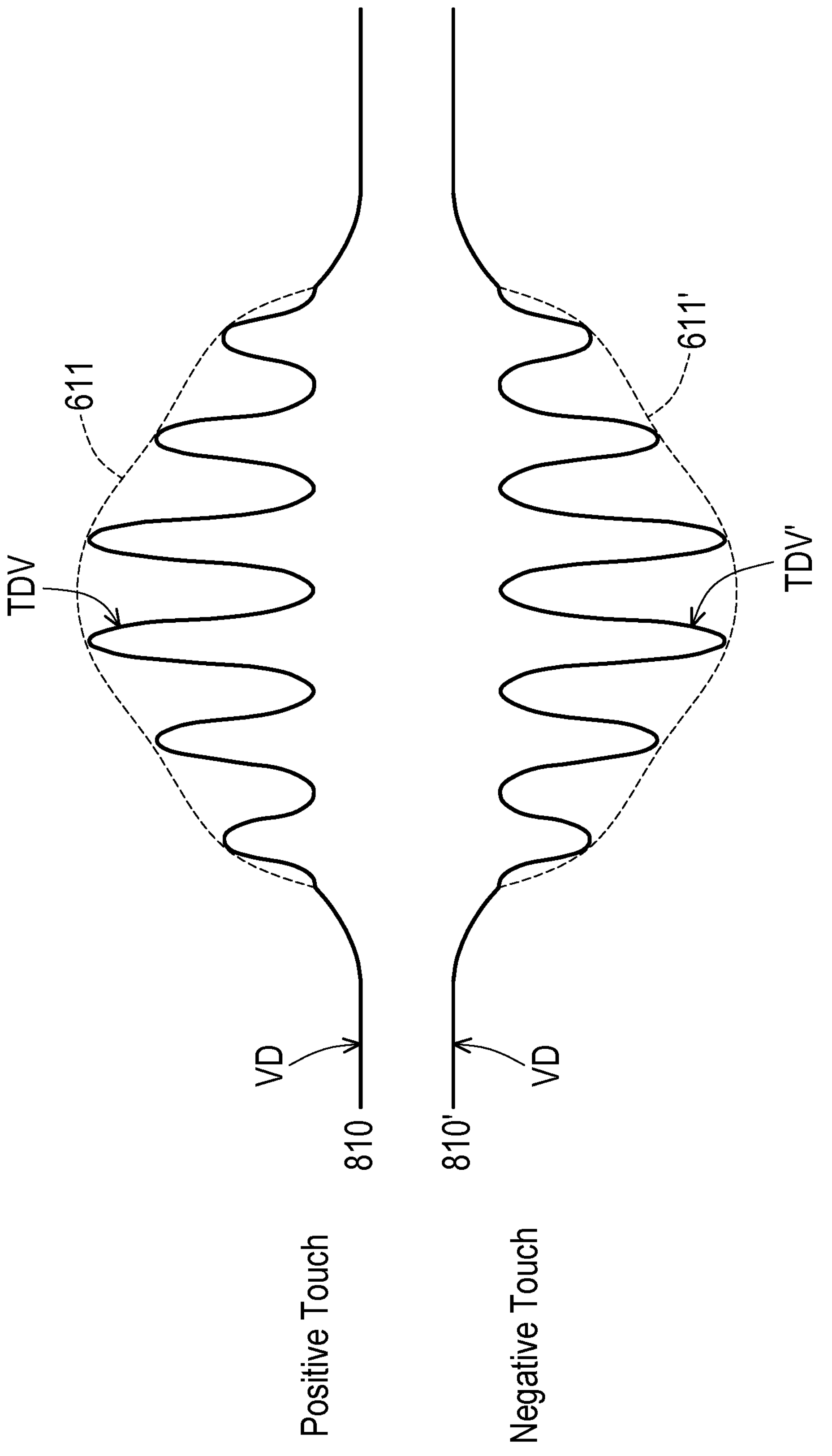

Please refer to FIG. 6, FIG. 7, and FIG. 8A and FIG. 8B commonly, wherein FIG. 8A and FIG. 8B illustrate waveform plots of the touch driving voltage of the driving signal according to another embodiment of present disclosure. In this case, the display driving voltage VD of the driving signal 810 is smaller than a minimum voltage of the touch display voltage TDV, or the display driving voltage VD of the driving signal 810 is larger than a maximum voltage of the touch display voltage TDV. In FIG. 7, the second value CV2 may be 0, a summation of the third value CV3 and the fourth value CV4 may be 0, the sixth value CV6 may be 0, and the fifth value CV5 may be twice of the first value CV1. For example, the first value CV1 may be 512, the third value may be 512, the fourth value CV4 may be −512, and the fifth value CV5 may be 1024. In FIG. 8A, a code OCA received by the signal converter 640, wherein the code OCA is generated by combining the third code DC3 and the output code OC. The code OCA corresponds to combination of the ramp wave 631 and the sine wave 621.

The control signal CSW2 is pulled to logic high to turn on the switch SW2 during the time periods tP1 and tP3, and the control signal CSW1 is pulled to logic low to cut-off the switch SW1 during the time periods tP1 and tP3. Besides, the control signal CSW1 is pulled to logic high to turn on the switch SW1 during the time period tP2, and the control signal CSW2 is pulled to logic low to cut-off the switch SW2 during the time period tP2. It should be noted here, in this embodiment, the voltage levels of the power voltage VRH are adjustable. During the time periods tP1 and tP3, the voltage level of the power voltage VRH is set to a voltage level VH1, and during the time period tP2, the voltage level of the power voltage VRH is set to a voltage level VH2, where the voltage level VH2 is larger than the voltage level VH1. A voltage level of the power voltage VRL is set to a voltage level VL1 during the time periods tP1 to tP3. In this embodiment, the voltage levels VH2>VL1>VH1.

On the other hand, the touch driving voltage TDV of the driving signal 810 generated by the signal converter 640 is: a ramp wave gradually increasing from the voltage level VH1 to VL1 during the time period tP1; a sine wave which swinging between the voltage level VL1 to the voltage level VH2 during the time period tP2; and a ramp wave gradually decreasing from the voltage level VL1 to VH1 during the time period tP3. Wherein, the sine wave during the time period tP2 is enveloped by the sine wave 611.

It should be noted here, by setting the voltage level VH1 equal to a display driving voltage VD. Voltage level of the driving signal 810 may be gradually increased or decreased when operation function switching between a display function and a touch detection function. That is, harmonics of the driving signal 810 can be reduced effectively, and EMI can be reduced, too.

In FIG. 8B, in a positive touch operation, the display driving voltage VD of the driving signal 810 is smaller than a minimum voltage of the touch display voltage TDV, the amplitude of the touch display voltage TDV of the driving signal 810 may be not smaller than 0V, and the touch display voltage TDV is enveloped by the sine wave 621 with a positive amplitude. On the other hand, in a negative touch operation, the display driving voltage VD of the driving signal 810' is larger than a maximum voltage of the touch display voltage TDV, the amplitude of the touch display voltage TDV' of the driving signal 810' may not be larger than 0V, and the touch display voltage TDV' is enveloped by the sine wave 621' which is inverted to the sine wave 621.

Figure 9:
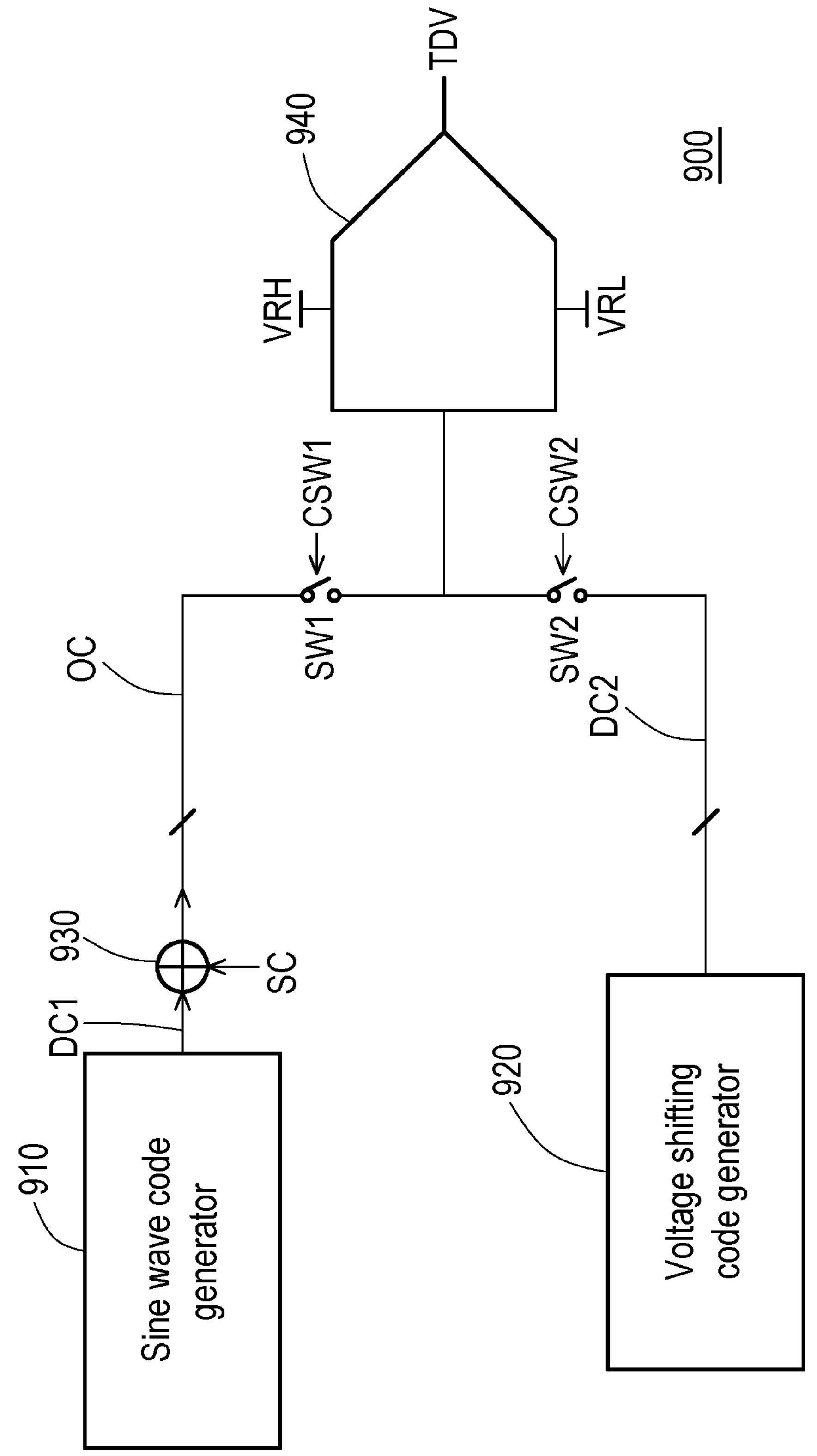
FIG. 9 illustrates a schematic diagram of a driving signal generator according to an embodiment of present disclosure.

Please refer to FIG. 9, which illustrates a schematic diagram of a driving signal generator according to an embodiment of present disclosure. A driving signal generator 900 includes a sine wave code generator 910, a voltage shifting code generator 920, an operation circuit 930 signal converter 940 and switches SW1 and SW2. The sine wave code generator 910 is configure to generate a first code DC1 corresponding to a sine wave. The operation circuit 930 may be an adder. The operation circuit 930 adds the code DC1 with a shifting code SC to generate an output code OC. The voltage shifting code generator 920 is configure to generate a second code DC2 corresponding to a ramp wave.

Figure 10:
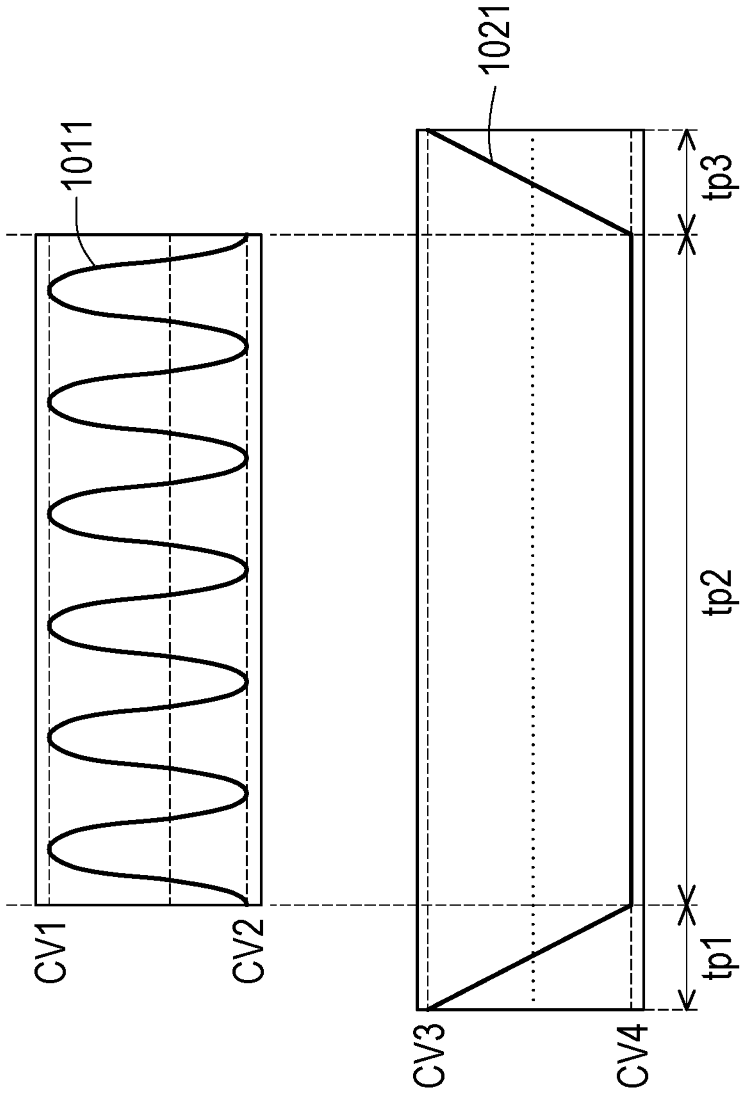
FIG. 10 illustrates a schematic diagram of code providing operation of the sine wave code generator 910 and the voltage shifting code generator 920 of the embodiment of FIG. 9.

Please refer to FIG. 10, which illustrates a schematic diagram of code providing operation of the sine wave code generator 910 and the voltage shifting code generator 920 of the embodiment of FIG. 9. The sine wave code generator 910 provides the first code DC1 corresponding to a sine wave 1011. The voltage shifting code generator 920 provides the second code DC2 corresponding to a ramp wave 1021. The sine wave 1011 is generated during a time period tP2. During a time period tP1, the ramp wave 1021 has a negative slope; during a time period tP3, the ramp wave 1021 has a positive slope; and during the time period tP2, the ramp wave 1021 may be a horizontal line. The time period tP1 is before the time period tP3, and the time period tP2 is between the time periods tP1 and tP3.

In this embodiment, the first code DC1 generated by the sine wave code generator 910 is between a first value CV1 and a second value CV2. The second code DC2 generated by the voltage shifting code generator 920 is between a third value CV3 and a fourth value CV4.

Figure 11A:
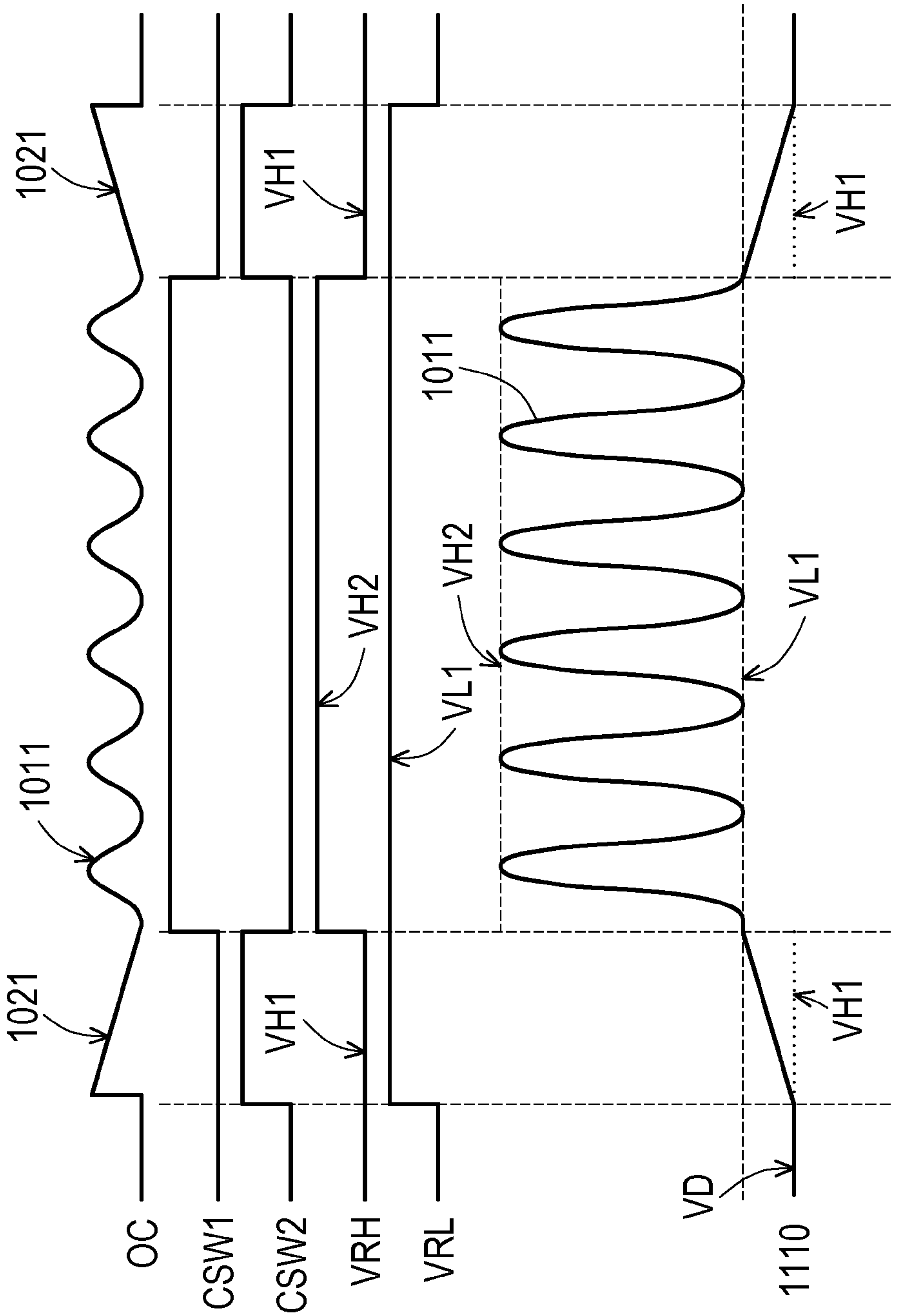
FIG. 11A and FIG. 11B illustrate waveform plots of the touch driving voltage of the driving signal according to another embodiment of present disclosure.
Figure 11B:
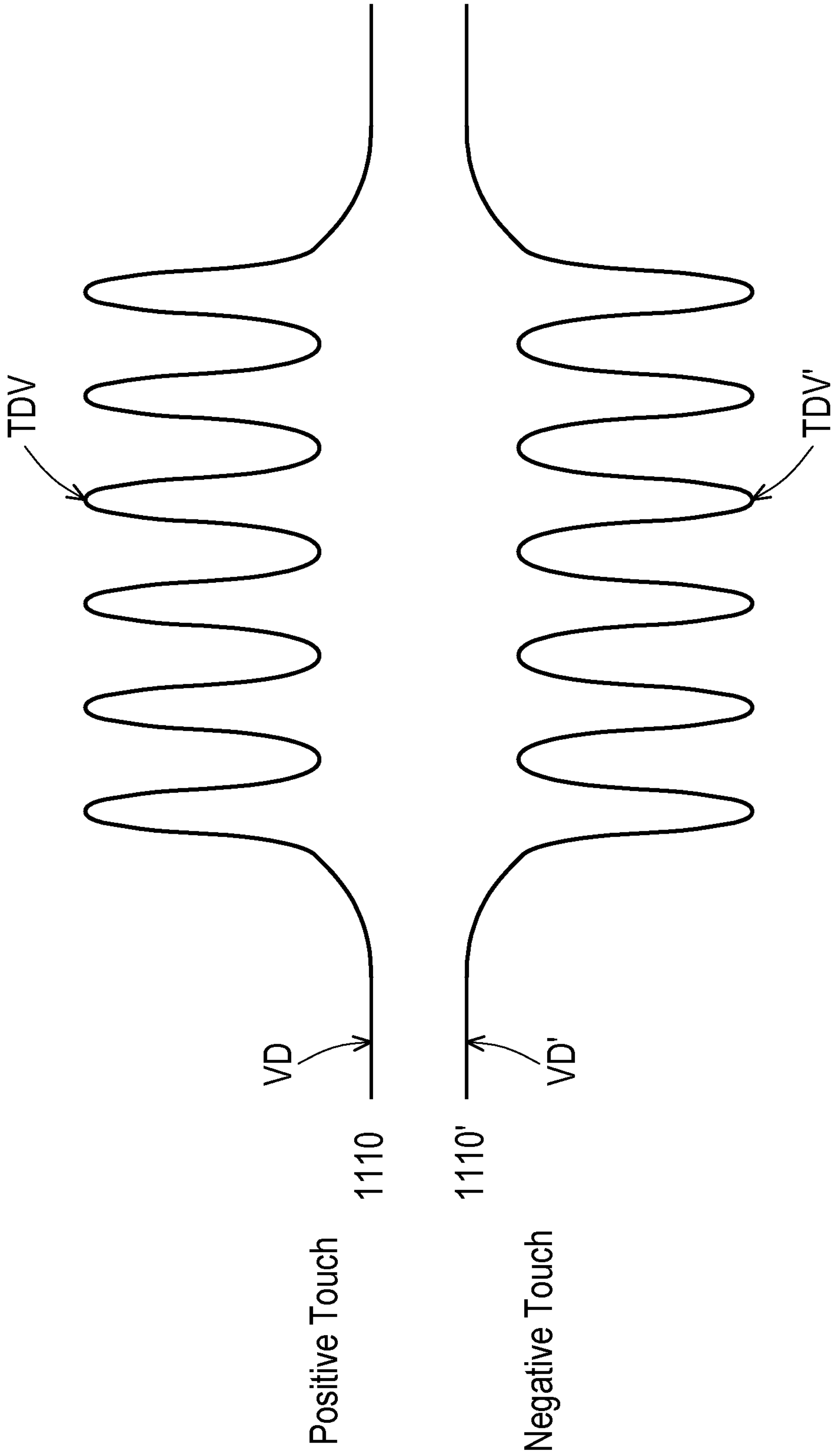

Please refer to FIG. 9, FIG. 10, and FIG. 11A and FIG. 11B commonly, wherein FIG. 11A and FIG. 11B illustrate waveform plots of the touch driving voltage of the driving signal according to another embodiment of present disclosure. In this case, the display driving voltage VD of the driving signal 1110 is smaller than a minimum voltage of the touch display voltage TDV, or the display driving voltage VD of the driving signal 1110 is larger than a maximum voltage of the touch display voltage TDV. In FIG. 10, the first value CV1 may be 512, the second value CV2 may be −512, and the third value CV3 may be 1024, and the fourth value CV4 may be 0. In FIG. 11A, a code OCA received by the signal converter 940, wherein the code OCA is generated by combining the third code DC2 and the output code OC. The code OCA corresponds to combination of the ramp wave 921 and the sine wave 911.

The control signal CSW2 is pulled to logic high to turn on the switch SW2 during the time periods tP1 and tP3, and the control signal CSW1 is pulled to logic low to cut-off the switch SW1 during the time periods tP1 and tP3. Besides, the control signal CSW1 is pulled to logic high to turn on the switch SW1 during the time period tP2, and the control signal CSW2 is pulled to logic low to cut-off the switch SW2 during the time period tP2. It should be noted here, in this embodiment, the voltage levels of the power voltage VRH are adjustable. During the time periods tP1 and tP3, the voltage level of the power voltage VRH is set to a voltage level VH1, and during the time period tP2, the voltage level of the power voltage VRH is set to a voltage level VH2, where the voltage level VH2 is larger than the voltage level VH1. A voltage level of the power voltage VRL is set to a voltage level VL1 during the time periods tP1 to tP3. In this embodiment, the voltage levels VH2>VL1>VH1.

On the other hand, the touch driving voltage TDV of the driving signal 1110 generated by the signal converter 940 is: a ramp wave gradually increasing from the voltage level VH1 to VL1 during the time period tP1; a sine wave which swinging between the voltage level VL1 to the voltage level VH2 during the time period tP2; and a ramp wave gradually decreasing from the voltage level VL1 to VH1 during the time period tP3. Wherein, the sine wave during the time period tP2 is enveloped by the sine wave 1011.

It should be noted here, by setting the voltage level VH1 equal to a display driving voltage VD. Voltage level of the driving signal 1110 may be gradually increased or decreased when operation function switching between a display function and a touch detection function. That is, harmonics of the driving signal 1110 can be reduced effectively, and EMI can be reduced, too.

In FIG. 11B, in a positive touch operation, the display driving voltage VD of the driving signal 1110 is smaller than a minimum voltage of the touch display voltage TDV, the amplitude of the touch display voltage TDV of the driving signal 810 may be not smaller than 0V, and the touch display voltage TDV is enveloped by the sine wave 621 with a positive amplitude. On the other hand, in a negative touch operation, the display driving voltage VD of the driving signal 1110' is larger than a maximum voltage of the touch display voltage TDV', the amplitude of the touch display voltage TDV' of the driving signal 1110' may not be larger than 0V.

In summary, the driving signal generator of present disclosure provides digital codes and generates a touch driving voltage of a driving signal. In this embodiment, a voltage level of the driving signal is gradually increased or decreased when a touch display device switches between a display function and a touch detection function. Such as that, harmonics on the driving signal pf the touch display device can be reduced, and EMI can be reduced correspondingly, too.

What is claimed is:

1. A driving signal generator, adapted for a touch display device, comprising:

- a window function code generator, generating a first code corresponding to a window of a first sine wave;
- a sine wave code generator, generating a second code corresponding to a second sine wave, wherein the first sine wave is an envelope of the second sine wave, and a frequency of the second sine wave is higher than a frequency of the first sine wave; and
- an operation circuit, coupled to the window function code generator and the sine wave code generator, and performing an operation on the first code and the second code to generate an output code;
- a signal converter, coupled to the operation circuit, generating a touch driving voltage on a driving signal by converting the output code; and a voltage shifting code generator, generating a code corresponding to a ramp wave;

a first switch, coupled between the operation circuit and the signal converter, controlled by a first control signal to provide the output code to the signal converter; and a second switch, coupled between the voltage shifting code generator and the signal converter, controlled by a second control signal to provide the code corresponding to the ramp wave to the signal converter.

2. The driving signal generator according to claim 1, wherein the operation circuit comprises:

a multiplier, receiving the first code and the second code, generating a third code by multiplying the first code with the second code; and an adder, coupled to the multiplier, generating the output code by adding a shift code with the third code.

3. The driving signal generator according to claim 1, wherein the window function code generator adjusts a value of the first code in a time sequence correspond to an amplitude of the first sine wave, the sine wave code generator adjusts a value of the second code in the time sequence correspond to an amplitude of the second sine wave.

4. The driving signal generator according to claim 1, wherein a maximum voltage of the touch driving voltage is larger than a display driving voltage of the touch display device, and a minimum voltage is smaller than the display driving voltage of the touch display device.

5. The driving signal generator according to claim 4, wherein the first code is varied between a first value and a second value, wherein the second value is half of the first value, the second code is varied between a third value and a fourth value, wherein a summation of the third value and the fourth value is 0.

6. The driving signal generator according to claim 1, wherein a minimum voltage or a maximum voltage of the touch driving voltage is equal to a display driving voltage of the touch display device.

7. The driving signal generator according to claim 6, wherein the first code is varied between a first value and 0, the second code is varied between a second value and a third value, wherein a summation of the second value and the third value is 0.

8. The driving signal generator according to claim 1, wherein when the first switch is turned on the second switch is cut-off, and when the second switch is turned on the first switch is cut-off.

9. The driving signal generator according to claim 1, wherein the first code is varied between a first value and 0, the second code is varied between a second value and a third value, wherein a summation of the second value and the third value is 0, and the third code is varied between a fourth value and 0, wherein the fourth value is twice of the first value.

10. The driving signal generator according to claim 1, wherein the second switch is turned on during a first time period and a second time period, the first switch is turned on during a third time period, wherein in a touch detection time period, the third time period is between the first time period and the second time period.

11. The driving signal generator according to claim 1, wherein the signal converter is a digital to analog converter.

12. The driving signal generator according to claim 1, wherein the first code and the second code are digital code.

* * * * *